United States Patent
Chalk et al.

(10) Patent No.: US 9,494,281 B2
(45) Date of Patent: Nov. 15, 2016

(54) COMPRESSOR ASSEMBLIES AND METHODS TO MINIMIZE VENTING OF A PROCESS GAS DURING STARTUP OPERATIONS

(75) Inventors: David Jonathan Chalk, Slatington, PA (US); David John Farese, Riegelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 682 days.

(21) Appl. No.: 13/418,995

(22) Filed: Mar. 13, 2012

(65) Prior Publication Data

US 2013/0125568 A1    May 23, 2013

Related U.S. Application Data

(60) Provisional application No. 61/560,976, filed on Nov. 17, 2011.

(51) Int. Cl.
*F25B 1/00* (2006.01)
*F17C 5/02* (2006.01)
*F04D 29/58* (2006.01)

(52) U.S. Cl.
CPC .............. *F17C 5/02* (2013.01); *F04D 29/584* (2013.01); *F04D 29/5833* (2013.01);
(Continued)

(58) Field of Classification Search
CPC ............... F25B 2400/0403; F25B 1/10; F25B 2600/022; F25B 2600/2501; F25B 2700/21162; F25J 1/0296; F25J 1/0297; F25J 3/04012; F25J 2230/02; F25J 2230/24; F05D 2260/211; F05B 2260/211; F17C 7/02; F17C 7/04; F17C 9/02; F17C 9/04; F17C
(Continued)

(56) References Cited

U.S. PATENT DOCUMENTS 3,630,639 A    12/1971  Duron et al.
3,889,485 A     6/1975  Swearingen
(Continued)

FOREIGN PATENT DOCUMENTS

WO        99/50537 A1    10/1999
WO    2004/031644 A1     4/2004
(Continued)

*Primary Examiner* — M. Alexandra Elve
*Assistant Examiner* — Kun Kai Ma
(74) *Attorney, Agent, or Firm* — Bryan C. Hoke, Jr.

(57) ABSTRACT

Systems and methods are provided for compressing a cryogenic fluid using a multi-stage compressor. Coolant in a first coolant loop cools cooling jackets of the compression stages and/or inter-stage heat exchangers and warms a pre-compression heat exchanger. The temperature of the coolant in the first heat exchanger is moderated by ambient-air heat exchange. The process fluid is electively cooled by one of the interstage heat exchangers after each of the compression stage if the temperature of the process fluid is above a temperature criterion. This enables the system to operate through a transient period (cool down period) without venting process fluid. The interstage heat exchangers are preferably bypassed when the system reaches steady-state operating temperature.

22 Claims, 3 Drawing Sheets

(52) U.S. Cl.
CPC .......... *F17C 2205/0323* (2013.01); *F17C 2205/0335* (2013.01); *F17C 2221/033* (2013.01); *F17C 2223/0161* (2013.01); *F17C 2223/045* (2013.01); *F17C 2223/047* (2013.01); *F17C 2227/0135* (2013.01); *F17C 2227/0157* (2013.01); *F17C 2227/0337* (2013.01); *F17C 2227/0344* (2013.01); *F17C 2227/0355* (2013.01); *F17C 2227/0386* (2013.01); *F17C 2250/0439* (2013.01); *F17C 2250/072* (2013.01); *F17C 2270/02* (2013.01); *F17C 2270/05* (2013.01); *Y02E 60/321* (2013.01)

(58) Field of Classification Search
CPC ............ 2227/0185;F17C 2227/03; F17C 2227/0302; F17C 2227/0309; F17C 2227/0323; F17C 2227/0327
USPC ............ 62/50.2, 115, 53.2, 48.2; 417/53
See application file for complete search history.

(56) References Cited

U.S. PATENT DOCUMENTS

| | | | |
|---|---|---|---|
| 4,362,462 A * | 12/1982 | Blotenberg | F04D 29/5833 415/1 |
| 4,472,946 A | 9/1984 | Zwick | |
| 4,571,151 A * | 2/1986 | Paul | F04D 29/5846 415/1 |
| 4,600,124 A * | 7/1986 | Price | 222/54 |
| 4,860,545 A | 8/1989 | Zwick et al. | |
| 5,137,558 A | 8/1992 | Agrawal | |
| 5,139,547 A | 8/1992 | Agrawal et al. | |
| 5,218,827 A | 6/1993 | Pevzner | |
| 5,411,374 A | 5/1995 | Gram | |
| 5,520,000 A | 5/1996 | Pevzner | |
| 5,537,828 A | 7/1996 | Borcuch et al. | |
| 6,474,078 B2 | 11/2002 | Chalk et al. | |
| 6,481,218 B1 | 11/2002 | Drelser | |
| 6,912,858 B2 | 7/2005 | White | |
| 7,410,348 B2 | 8/2008 | Chalk et al. | |
| 2001/0004830 A1 * | 6/2001 | Wakana et al. | 60/39.182 |
| 2005/0022552 A1 * | 2/2005 | Lucas | F04D 27/0207 62/613 |
| 2007/0214804 A1 | 9/2007 | Hannan et al. | |
| 2007/0214805 A1 * | 9/2007 | MacMillan | F17C 5/06 62/50.2 |
| 2007/0214806 A1 * | 9/2007 | Faka | F17C 5/06 62/50.2 |
| 2007/0227614 A1 * | 10/2007 | Kurita | B60S 5/02 141/26 |
| 2008/0006053 A1 * | 1/2008 | Bauer | F25J 1/0022 62/612 |
| 2008/0008602 A1 * | 1/2008 | Pozivil | F28F 27/02 417/243 |
| 2008/0148770 A1 * | 6/2008 | Migliore | F25J 1/0022 62/612 |
| 2008/0170948 A1 * | 7/2008 | Martinez et al. | 417/53 |
| 2009/0100863 A1 * | 4/2009 | Dee et al. | 62/640 |
| 2009/0113928 A1 * | 5/2009 | Vandor | F25J 1/0022 62/612 |
| 2009/0249829 A1 * | 10/2009 | Lourenco | C10L 3/10 62/632 |
| 2009/0293503 A1 * | 12/2009 | Vandor | F01D 15/005 62/45.1 |
| 2010/0064714 A1 * | 3/2010 | Tashiro | 62/259.2 |
| 2010/0146971 A1 * | 6/2010 | Mak | 60/651 |
| 2010/0229573 A1 * | 9/2010 | Ehrstrom | F17C 5/06 62/50.2 |
| 2011/0113822 A1 * | 5/2011 | Douven | F25B 40/04 62/510 |
| 2011/0155816 A1 * | 6/2011 | Jeong et al. | 236/92 B |
| 2012/0159970 A1 * | 6/2012 | Reese | F17C 5/007 62/53.2 |
| 2012/0241129 A1 * | 9/2012 | Kohl et al. | 165/58 |

FOREIGN PATENT DOCUMENTS

| | | |
|---|---|---|
| WO | 2007/011155 A1 | 1/2007 |
| WO | 2010/007535 A1 | 1/2010 |
| WO | WO 2011036239 A1 * | 3/2011 |

* cited by examiner

COMPRESSOR ASSEMBLIES AND METHODS TO MINIMIZE VENTING OF A PROCESS GAS DURING STARTUP OPERATIONS

CROSS-REFERENCE TO RELATED APPLICATIONS

This patent application claims priority from Provisional Application Ser. No. 61/560,976, titled "Compressor Assemblies and Methods to Minimize Venting of a Process Gas During Startup Operations", filed on Nov. 17, 2011, the contents of which are hereby incorporated by reference.

BACKGROUND

Compressed gases are used in many industries, including heath care, chemicals, and manufacturing. To provide a compressed gas in a convenient format, compressors are used to reduce the volume of the gas. Compressors useful for compressing a gas include multiple stage compressors, as well as more than one compressor placed in series. Thus, the pressure of a process fluid can be gradually increased from an inlet pressure to a final outlet pressure.

Cryogenic liquids provide a benefit to distribution because of their high density at low pressure. These liquids are transported and stored as liquids but are often used as gas at ambient temperature. Cryogenic pumps or compressors are commonly used, and it is for this purpose the invention is intended.

Compressors for compressing cryogenic gas are well known in the art and are often used to compress boil off gas from cryogenic storage tanks and in air separation processes. Such compressors can consist of a single compression stage or can have multiple compression stages. For multiple stage compressors, the gas being compressed ("process stream") can be cooled between stages or can be passed on to the subsequent stages without cooling. In systems having inter-stage cooling, it is known to cool the process stream of a multi-stage compressor using a cryogenic heat sink. It is also known to use heat exchangers between compression stages in which the process stream is cooled against a cryogenic fluid, such as liquid natural gas (LNG). All of these systems, however, are designed to be cooled down to a steady state temperature prior to normal operation and are not designed to operate normally during this transient period.

During the transient period, the process fluid of a cryogenic compressor or pump is not compressed and is generally vented off, resulting in a loss of process fluid. Such venting is terminated when the compressor stages and associated fluid systems have cooled to a temperature that allows the machine to operate in cryogenic mode. Such venting of the process stream is undesirable because of the loss of product and associated cost.

Accordingly, there is a need for an improved system that is capable of operating in a transient cool-down period without venting the process stream.

SUMMARY

The invention disclosed herein satisfies the aforementioned needs by providing a multi-stage compressor system having an inter-stage heat exchanger between each compression stage through which the process fluid flows during the transient cool-down phase.

There are several aspects of the fluid compression system and method as outlined below.

Aspect 1. A fluid compression system for compressing a fluid, the fluid compression system comprising:
(a) a first heat exchanger to provide heat exchange between a first coolant and an external heat sink;
(b) a second heat exchanger to provide heating of a fluid from a tank via heat exchange with the first coolant;
(c) a multi-stage compressor comprising:
(c1) a first compression stage operatively disposed to receive the fluid from the second heat exchanger;
(c2) at least one of (i) a third heat exchanger to provide cooling of at least a portion of the fluid leaving the first compression stage via heat exchange with the first coolant and (ii) a first cooling jacket to provide cooling of the fluid in the first compression stage via heat exchange with the first coolant; and
(c3) a second compression stage operatively disposed to receive at least a portion of the fluid from the first compression stage; and
(d) a first coolant loop operatively disposed to circulate the first coolant through the first heat exchanger, the second heat exchanger, and the at least one of the third heat exchanger and the first cooling jacket.

Aspect 2. The fluid compression system of aspect 1 wherein the external heat sink is ambient air.

Aspect 3. The fluid compression system of aspect 1 or aspect 2 further comprising:
(e) a first valve for receiving the fluid from the tank;
(f) a first bypass conduit to electively convey the fluid from the tank without the fluid passing through the second heat exchanger;
wherein the first valve is operatively disposed to distribute the fluid to the second heat exchanger and the first bypass conduit;
(g) a first temperature sensor operatively disposed to measure a temperature of the fluid entering the first compression stage; and
(h) a controller in signal communication with the first temperature sensor, the controller configured to cause the first valve to distribute at least a portion of the fluid to the second heat exchanger when the first temperature sensor detects that the temperature measured by the first temperature sensor is less than a first temperature criterion, and to cause the first valve to distribute at least a portion of the fluid to the first bypass conduit when the first temperature sensor detects that the temperature measured by the first temperature sensor is greater than the first temperature criterion.

Aspect 4. The fluid compression system of aspect 3, wherein the controller is configured to cause the first valve to direct all the fluid to the second heat exchanger when the first temperature sensor detects that the temperature measured by the first temperature sensor is less than the first temperature criterion, and to cause the first valve to distribute all the fluid to the first bypass conduit when the first temperature sensor detects that the temperature measured by the first temperature sensor is greater than the first temperature criterion.

Aspect 5. The fluid compression system of aspect 3 or aspect 4, wherein the first temperature criterion is a first set point temperature.

Aspect 6. The fluid compression system of any one of aspects 3-5 further comprising:
a second valve for receiving the fluid from the first compression stage;
a second bypass conduit to electively convey the fluid from the first compression stage without the fluid passing through the third heat exchanger; and a second temperature sensor operatively disposed to measure a temperature of the fluid leaving the first compression stage;

wherein the second valve is operatively disposed to distribute the fluid to the third heat exchanger and the second bypass conduit; and wherein the controller is in signal communication with the second temperature sensor and configured to cause the second valve to distribute at least a portion of the fluid to the third heat exchanger when the second temperature sensor detects that the temperature measured by the second temperature sensor is greater than a second temperature criterion, and to cause the second valve to distribute at least a portion of the fluid to the second bypass conduit when the second temperature sensor detects that the temperature measured by the second temperature sensor is less than the second temperature criterion.

Aspect 7. The fluid compression system of aspect 6, wherein the controller is configured to cause the second valve to direct all of the fluid to the third heat exchanger when the second temperature sensor detects that the temperature measured by the second temperature sensor is greater than the second temperature criterion, and to cause the second valve to direct all of the fluid to the second bypass conduit when the second temperature sensor detects that the temperature measured by the second temperature sensor is less than the second temperature criterion.

Aspect 8. The fluid compression system of aspect 6 or aspect 7, wherein the second temperature criterion is a second set point temperature.

Aspect 9. The fluid compression system of any one of aspects 1-8, wherein the multistage compressor further comprises
a third compression stage operatively disposed to receive at least a portion of the fluid from the second compression stage; and at least one of (i) a fourth heat exchanger to provide cooling of at least a portion of the fluid leaving the second compression stage via heat exchange with the first coolant, and (ii) a second cooling jacket to provide cooling of the fluid in the second compression stage via heat exchange with the first coolant; and wherein the first coolant loop is further operatively disposed to circulate the first coolant through the at least one of the fourth heat exchanger and the second cooling jacket.

Aspect 10. The fluid compression system of aspect 9, wherein the multistage compressor further comprises a third bypass conduit to electively convey the fluid from the second compression stage to the third compression stage without the fluid passing through the fourth heat exchanger;

a third valve for receiving the fluid from the second compression stage; and a third temperature sensor operatively disposed to measure a temperature of the fluid leaving the second compression stage; and wherein the controller is further in signal communication with the third temperature sensor, the controller configured to cause the third valve to distribute at least a portion of the fluid to the fourth heat exchanger when the third temperature sensor detects that the temperature measured by the third temperature sensor is greater than a third temperature criterion, and to cause the third valve to distribute at least a portion of the fluid to the third bypass conduit when the third temperature sensor detects that the temperature measured by the third temperature sensor is less than the third temperature criterion.

Aspect 11. The fluid compression system of aspect 10, wherein the controller is configured to cause the third valve to direct all the fluid to the fourth heat exchanger when the third temperature sensor detects that the temperature measured by the third temperature sensor is less than the third temperature criterion, and to cause the third valve to distribute all the fluid to the third bypass conduit when the third temperature sensor detects that the temperature measured by the third temperature sensor is greater than the third temperature criterion.

Aspect 12. The fluid compression system of aspect 11, wherein the third temperature criterion is a third set point temperature.

Aspect 13. The fluid compression system of any one of aspects 1-12 further comprising:

a fifth heat exchanger to provide heat exchange between a second coolant and a second external heat sink;

wherein the multistage compressor further comprises a sixth heat exchanger to provide cooling of at least a portion of the fluid leaving the first compression stage via heat exchange with the second coolant; and a second coolant loop operatively disposed to circulate the second coolant through the fifth heat exchanger and the sixth heat exchanger.

Aspect 14. The fluid compression system of aspect 13 wherein the second external heat sink is ambient air.

Aspect 15. The fluid compression system of any one of aspects 9-14, further comprising:

a first pressure bypass operatively disposed to enable fluid that has passed through the first compression stage to bypass the second compression stage and feed the third compression stage.

Aspect 16. A method for compressing a fluid supplied from a cryogenic storage vessel, the method comprising:

(a) circulating a first coolant through a first heat exchanger, a second heat exchanger, and at least one of a third heat exchanger and a first cooling jacket;

(b) heating the fluid by passing at least a portion of the fluid to the second heat exchanger to exchange heat with the first coolant thereby cooling the first coolant;

(c) compressing the fluid from step (b) in a first compression stage 14 of a multi-stage compressor; and (d) further compressing at least a portion of the fluid from the first compression stage in a second compression stage 16 of the multi-stage compressor;

wherein the first coolant is circulated to the first heat exchanger to exchange heat with an external heat sink; and wherein at least one of (i) the fluid is cooled by heat exchange with the first coolant flowing through the first cooling jacket during step (c) and (ii) at least a portion of the fluid is passed to the third heat exchanger and is cooled by heat exchange with the first coolant in the third heat exchanger after step (c) and before step (d).

Aspect 17. The method of aspect 16 wherein the external heat sink is ambient air.

Aspect 18. The method of aspect 16 or aspect 17 further comprising:

further compressing at least a portion of the fluid from the second compression stage in a third compression stage of the multi-stage compressor; and wherein at least one of (i) the fluid is cooled by heat exchange with the first coolant flowing through a second cooling jacket during step (d) and (ii) at least a portion of the fluid is passed to a fourth heat exchanger and is cooled by heat exchange with the first coolant in the fourth heat exchanger after step (d) wherein the first coolant is circulated through the fourth heat exchanger.

Aspect 19. The method of any one of aspects 16-18 further comprising:
measuring a temperature of the fluid prior to entering the first compression stage; and
adjusting the amount of the fluid passed to the second heat exchanger to heat more fluid when the measured temperature of the fluid prior to entering the first compression stage is less than a first temperature criterion, and to heat less fluid when the measured temperature of the fluid prior to entering the first compression stage is greater than the first temperature criterion.

Aspect 20. The method of any one of aspects 16-19 further comprising:
measuring a temperature of the fluid after passing through the first compression stage;
adjusting the amount of the fluid passed to the third heat exchanger to cool more fluid when the measured temperature of the fluid after passing through the first compression stage is greater than a second temperature criterion and to cool less fluid when the measured temperature of the fluid after passing through the first compression stage is less than the second temperature criterion.

Aspect 21. The method of any one of aspects 16-20 further comprising:
measuring a temperature of the fluid after passing through the second compression stage;
adjusting the amount of the fluid passed to a fourth heat exchanger to cool more fluid when the measured temperature of the fluid after passing through the second compression stage is greater than a third temperature criterion and to cool less fluid when the measured temperature of the fluid after passing through the second compression stage is less than the third temperature criterion;
wherein the first coolant is also circulated through the fourth heat exchanger.

Aspect 22. The method of claim any one of aspects 16-21 further comprising:
circulating a second coolant through a fifth heat exchanger and a sixth heat exchanger;
wherein the second coolant is circulated to the fifth heat exchanger to exchange heat with a second external heat sink; and
wherein the fluid is passed to the sixth heat exchanger and is cooled by heat exchange with the second coolant in the sixth heat exchanger 148 after step (c) and before step (d).

Aspect 23. The method of aspect 22 wherein the second external heat sink is ambient air.

Aspect 24. A method for compressing a fluid, the method comprising:
(a) providing the fluid compression system of any one of aspects 1-15;
(b) circulating the first coolant through the first heat exchanger, the second heat exchanger, and at least one of the third heat exchanger and the first cooling jacket;
(c) heating the fluid by passing at least a portion of the fluid to the second heat exchanger to exchange heat with the first coolant thereby cooling the first coolant;
(d) compressing the fluid from step (c) in the first compression stage 14 of the multi-stage compressor; and (e) further compressing at least a portion of the fluid from the first compression stage in the second compression stage of the multi-stage compressor;
wherein the first coolant is circulated to the first heat exchanger to exchange heat with the external heat sink; and
wherein at least one of (i) the fluid is cooled by heat exchange with the first coolant flowing through the first cooling jacket during step (d) and (ii) at least a portion of the fluid is passed to the third heat exchanger and is cooled by heat exchange with the first coolant in the third heat exchanger after step (d) and before step (e).

Aspect 25. The method of aspect 24 wherein the external heat sink is ambient air.

Aspect 26. The method any of aspects 16-25 using the fluid compression system of any of aspects 1-15.

Aspect 27. The fluid compression system of any of aspects 1-15 performing the method of any of aspects 16-25.

Aspect 28. A fluid compression system for compressing a fluid, the fluid compression system comprising:
a multi-stage compressor comprising:
a first compression stage;
a valve for receiving the fluid from the first compression stage;
a heat exchanger to electively provide cooling of the fluid leaving the first compression stage;
a bypass conduit to electively convey the fluid from the first compression stage without the fluid passing through the heat exchanger;
a second compression stage for receiving at least a portion of the fluid from the bypass conduit and at least a portion of the fluid from the heat exchanger; and
a temperature sensor operatively disposed to measure a temperature of the fluid leaving the first compression stage;
wherein the valve is operatively disposed to distribute the fluid to the heat exchanger and the bypass conduit; and
a controller in signal communication with the temperature sensor, the controller configured to cause the valve to distribute at least a portion of the fluid to the heat exchanger when the temperature sensor detects that the temperature measured by the temperature sensor is greater than a temperature criterion, and to cause the valve to distribute at least a portion of the fluid to the bypass conduit when the temperature sensor detects that the temperature measured by the temperature sensor is less than the temperature criterion.

Aspect 29. The fluid compression system of any of Aspect 28, wherein the controller is configured to cause the valve to direct all of the fluid to the heat exchanger when the temperature sensor detects that the temperature measured by the temperature sensor is greater than the temperature criterion, and to cause the valve to direct all of the fluid to the bypass conduit when the temperature sensor detects that the temperature measured by the temperature sensor is less than the temperature criterion.

Aspect 30. The fluid compression system of any of Aspects 28-29, wherein the first temperature criterion is a set point temperature.

Aspect 31. A method for compressing a fluid supplied from a cryogenic storage vessel, the method comprising:
(a) passing the fluid to a first compression stage of a multi-stage compressor;
(b) measuring a temperature of the fluid after passing through the first compression stage;

(c) after performing step (a) and before performing step (d), directing at least a portion of the fluid through a heat exchanger to cool the fluid when the temperature is greater than a temperature criterion; and bypassing the heat exchanger when the temperature is less than the temperature criterion; and (d) passing at least a portion of the fluid from (c) to a second compression stage of the multi-stage compressor.

BRIEF DESCRIPTION OF SEVERAL VIEWS OF THE DRAWINGS

The foregoing summary, as well as the following detailed description of exemplary embodiments, is better understood when read in conjunction with the appended drawings. For the purpose of illustrating embodiments, there is shown in the drawings exemplary constructions; however, the invention is not limited to the specific methods and instrumentalities disclosed. In the drawings.

DETAILED DESCRIPTION

Figure 1:
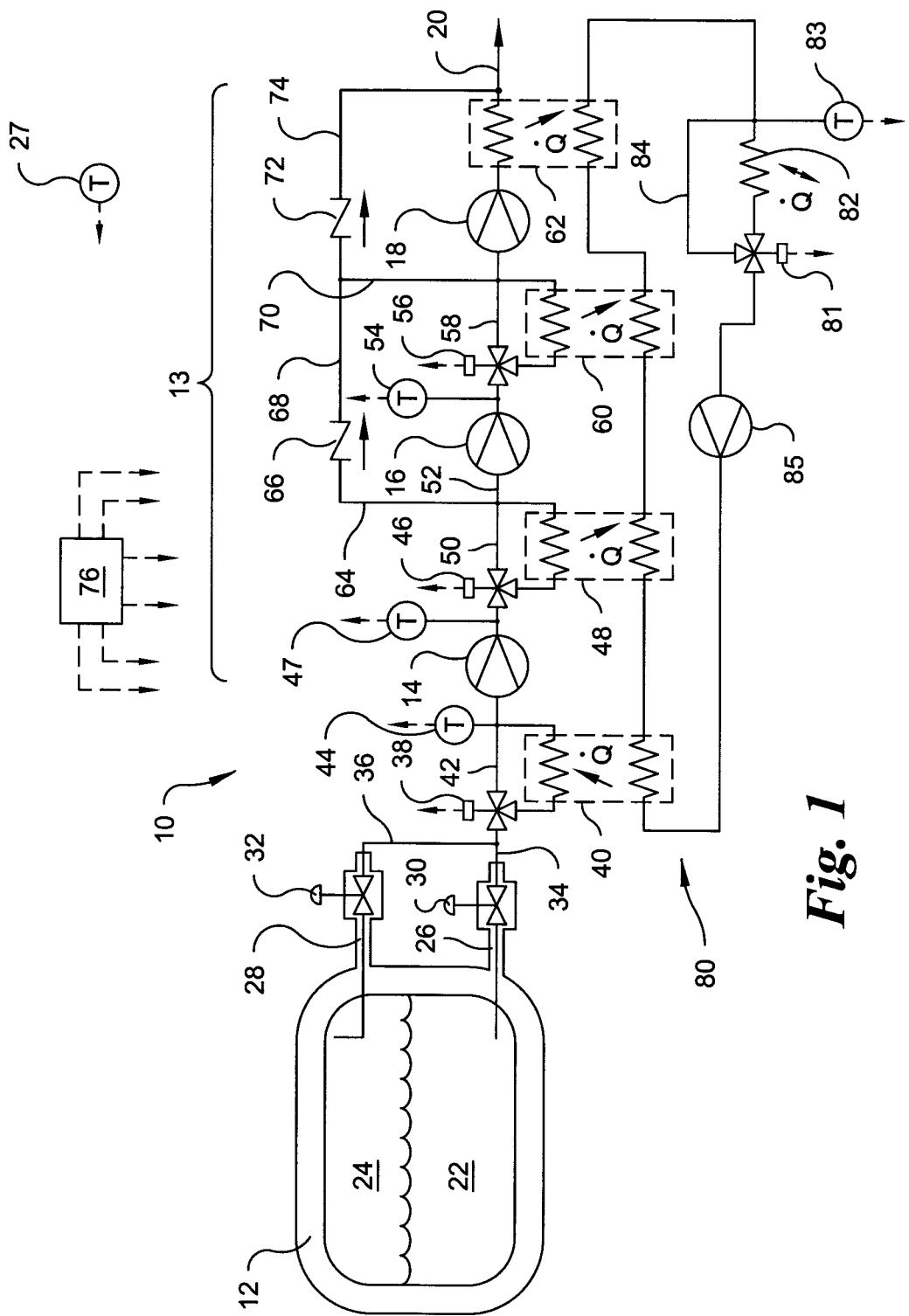
FIG. 1 is a schematic diagram showing a system in accordance with a first exemplary embodiment of the invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It should be understood that various changes may be made in the function and arrangement of elements without departing from the scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

The phrase "at least a portion" means "a portion or all." The at least a portion of a stream may have the same composition as the stream from which it is derived. The at least a portion of a stream may include specific components of the stream from which it is derived.

In order to aid in describing the invention, directional terms may be used in the specification and claims to describe portions of the present invention (e.g., upper, lower, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

In the claims, letters are used to identify claimed steps (e.g. (a), (b), and (c)). These letters are used to aid in referring to the method steps and are not intended to indicate the order in which claimed steps are performed, unless and only to the extent that such order is specifically recited in the claims.

Unless otherwise stated herein, any and all percentages identified in the specification, drawings and claims should be understood to be on a weight percentage basis.

Unless otherwise stated herein, any and all pressures identified in the specification, drawings and claims should be understood to mean gauge pressure.

As used in the specification and claims, the term "fluid flow communication" is intended to mean that two or more elements are operatively connected (either directly or indirectly) in a manner that enables fluids to flow between the elements, including connections that may contain valves, gates, or other devices that may selectively restrict and/or control fluid flow.

As used in the specification and claims, the terms downstream and upstream refer to the intended flow direction of the process fluid transferred. If the intended flow direction of the process fluid is from the first device to the second device, the second device is in downstream fluid flow communication of the first device.

In the drawings, the arrow shown in association with each heat exchanger indicates a direction of the flow of heat. In other words, the tail of the arrow represents the warmer side of the heat exchanger and the head of the arrow represents that colder side of the heat exchanger. Arrows having two heads indicate that the directly of heat flow may change depending upon the operating conditions of the system.

As used herein, the term "cryogen" or "cryogenic fluid" is intended to mean a liquid, gas, or mixed-phase fluid having a temperature less than −70 degrees C. Examples of cryogens include liquid hydrogen (LIH), liquid nitrogen (LIN), liquid oxygen (LOX), liquid argon (LAR), liquid helium, liquid carbon dioxide and pressurized, mixed phase cryogens (e.g., a mixture of LIN and gaseous nitrogen). Similarly, the term "cryogenic storage vessel" is intended to mean a vessel in which a cryogenic fluid is stored. As used herein, the term "cryogenic temperature" is intended to mean a temperature below −70 degrees C.

In order to overcome the drawbacks with existing compression equipment, the systems and methods described herein are designed to accommodate the induction of both ambient temperature gas and cryogenic fluids. In addition, they are configured to accommodate process fluids at cryogenic temperatures without the need to vent the process fluid when starting up and without the need for auxiliary cooling equipment.

In a transient period after start up of the systems (also referred to herein as the "cool-down period" or "transient period"), the systems described herein gradually switch over to function as a cryogenic multi-stage compressor as the equipment cools down (e.g., drop in temperature of the compressors and associated machinery). In one example, this transient period is accommodated by allowing each compression stage to discharge to a heat exchanger that cools the process fluid to about ambient temperature. Further, during this cool-down period, the inlet piping and other equipment cools due to the flow of the cryogenic process fluid, and the temperature at the inlet of the compressor is allowed to drop. Eventually, the inlet temperature will drop to a steady state value (dependent on the particular system configuration), at which point the transient period ends, and a steady state compression of the process fluid will proceed. This compression can be accomplished using multiple stages, some or all of which may operate at cryogenic temperature.

Referring to FIG. 1, a first exemplary embodiment of a compressor system 10 is shown. A storage tank 12 contains a process fluid that is to be compressed by a multi-stage compressor 13, then transported out of the system 10 by an outlet conduit 20. In this embodiment, the multi-stage compressor 13 comprises three compression stages 14, 16, 18, wherein a portion or all of the fluid is compressed.

In this embodiment, the process fluid is a cryogenic fluid, and therefore, the storage tank 12 includes a liquid phase portion 22 and gas phase portion 24. As explained above, the system 10 is capable of compressing cryogenic fluids (as shown in this embodiment) as well as non-cryogenic temperature gas. The storage tank 12 includes a liquid phase outlet 26 and gas phase outlet 28. Each outlet 26, 28 is in fluid flow communication with a respective valve 30, 32 that controls flow of the process fluid into conduits 34, 36. In this embodiment, the conduits 34, 36 merge downstream of valves 30, 32. If the system 10 was used to compress a process fluid at ambient temperatures, the storage tank 12 might not include a liquid phase portion 22 or a liquid phase outlet 26.

In many applications, the gas phase outlet 28 is used as the primary source of the process fluid. The liquid phase outlet 26 is used either instead of the gas phase outlet 28 or in combination with the gas phase outlet 28 if (a) it is desirable to reduce the temperature of the process fluid or (b) if the rate at which the process fluid is flowing out of the gas phase outlet 28 causes the pressure in the storage tank 12 to decline beyond a desired level.

Downstream from the merge point, flow of the process fluid can be routed to bypass conduit 42 or to a heat exchanger 40 by a valve 38. Heat exchanger 40 provides heating of the fluid from tank 12 via heat exchange with a first coolant. Any suitable coolant may be selected. Examples of suitable coolants include propylene glycol, Di-Limonene, or mineral or vegetable oil. The position of the valve 38 (% open or closed) may be determined by a controller 76, based upon the temperature of the process fluid, as measured by a temperature sensor 44 located at the downstream end of the heat exchanger 40. The temperature sensor 44 reports temperature data to controller 76. Based upon the temperature data reported by temperature sensor 44, the controller 76 selectively operates valve 38 to route process fluid through heat exchanger 40 or through a bypass conduit 42, which enables the process fluid to flow directly into a first compression stage 14 without passing through the heat exchanger 40. In this embodiment, the controller 76 operates the valve 38 to route process fluid through the heat exchanger 40 when the temperature sensor 44 measures a temperature that is below a set point temperature and through the bypass conduit 42 when the temperature sensor 44 measures a temperature that is above the set point temperature. In the case where the temperature sensor measures a temperature at, or very close to, the set point temperature, the controller may instruct the valve 38 to route the process fluid through the heat exchanger 40 and/or through the bypass conduit 42. In alternative embodiments, other process fluid parameters, such as pressure, could be used to determine the position of the valve 38.

The controller 76 is preferably in signal communication with all of the temperature sensors 44, 47, 54 and all of the valves 38, 46, 56, 81. Such signal communication could be by any suitable means, including hardwired and wireless connections. In order to reduce clutter in FIG. 1, signal connections between the controller 76 and other components are represented by an arrow terminating in a dashed line.

Alternatively, any of valves 28, 46, 56 and 81 may be operated by hand without the use of controller 76.

In this exemplary embodiment, valve 38 is shown as being a single, three-way valve. In a first position, the valve 38 directs all of the process fluid through the heat exchanger 40 and in a second position, the valve 38 directs all of the process fluid to the bypass conduit 42. This same functionality could be achieved using other valve configurations, such as two two-way valves. In addition, in some implementations, it may be desirable to use a proportional valve that enables the process fluid to be distributed between the heat exchanger 40 and the bypass conduit 42. Unless otherwise stated with respect to a particular valve, the alternative valve configurations discussed in this paragraph apply to all of the valves of system 10 and system 110. Since the article "a" means "one or more," the term "valve", as used in the claims, is intended to include single and multiple valve configurations, as well as proportional valves.

A valve 46 is positioned downstream from the first compression stage 14. Based upon temperature data reported by temperature sensor 47, the controller 76 instructs the valve 46 to direct the process fluid either through another heat exchanger 48 or to a bypass conduit 50 that bypasses the heat exchanger 48. The cooled process fluid is then conveyed to conduit 52 leading to a second compression stage 16.

Upon exiting the second compression stage 16, another temperature reading of the process fluid is taken by temperature sensor 54. Based upon temperature data reported by temperature sensor 54, the controller 76 selectively operates the valve 56 to direct the process fluid to either another heat exchanger 60 or to bypass conduit 58, which bypasses the heat exchanger 60. The process fluid then passes to a third compression stage 18. After passing through the third compression stage 18, the process fluid passes through another heat exchanger 62 before exiting the system.

In alternate embodiments, the controller 76 and any of the valves described herein (e.g., valve 38 or valve 46) could be configured to distribute a portion of the process fluid to a bypass conduit (e.g., bypass conduit 42 or bypass conduit 50) and a portion of the process fluid to a heat exchanger (e.g., heat exchanger 40 or heat exchanger 48). For example, the controller 76 could be a proportional-integral-derivative ("PID") controller.

This exemplary embodiment also includes a check-valve bypass assembly that enables the process fluid to bypass one or more of the compression stages 16, 18 if the pressure of the process fluid as it exits one compression stage is equal to or greater than the pressure of the process fluid after the next compression stage. This functionality is enabled by two check valves 66, 72 and conduits 64, 70, 74 which are in fluid flow communication with the downstream end of the inter-stage heat exchangers 48, 60, 62 and the bypass conduits 50, 58, respectively. Conduit 68 connects check valve 66 in fluid flow communication with check valve 72.

In FIG. 1, process fluid flowing through the heat exchanger 40 is shown as being warmed by a coolant circulating in a closed coolant loop 80 and process fluid flowing through heat exchangers 48, 60, 62 is shown as being cooled against the coolant in the same closed coolant loop 80. A compressor or pump 85 is provided to pressurize and circulate the coolant in the closed coolant loop 80. In addition, a heat exchanger 82 is provided on the closed coolant loop 80, which cools or warms the coolant against an external heat sink, for example, ambient air or water. A valve 81 and bypass conduit 84 enable the coolant to bypass the heat exchanger 82 when desirable. The valve 81 is controlled by the controller 76, based on input from a temperature sensor 83, which measures the temperature of the coolant, and temperature sensor 27, which measures the ambient temperature in the vicinity of the system 10.

When the system 10 is operating in the transient period, the temperature of the process fluid will be relatively high after each of the compression stages 14, 16, 18, which may cause the temperature of the coolant in closed coolant loop 80 to exceed ambient temperature. When the temperature of the coolant exceeds ambient temperature by a predetermined amount, the controller 76 operates the valve 81 to direct the coolant through the heat exchanger 82, which cools the coolant against the external heat sink (e.g. ambient air). The controller 76 could use the temperature sensor 27 to determine ambient temperature or, if ambient temperature is relatively constant, the controller 76 could be configured to use a preset mean ambient temperature. Similarly, when the system 10 reaches steady state, the relatively low temperature of the process fluid after each of the compression stages 14, 16, 18 could cause the temperature of the coolant temperature in the coolant in closed coolant loop 80 to drop below ambient temperature. When the temperature of the coolant drops below ambient temperature by a predetermined amount, the controller 76 operates the valve 81 to cause the coolant to flow through the heat exchanger 82, which warms the coolant against ambient air.

Alternatively, the closed coolant loop 80 could be omitted and the heat exchangers 40, 48, 60, 62 could exchange heat directly with ambient air. This configuration would be less complex and less costly, but would be able to operate in a narrower range of ambient temperatures. In addition, this would not enable the inter-stage heat exchangers 48, 60, 62 to utilize refrigeration from heat exchanger 40.

Figure 2:
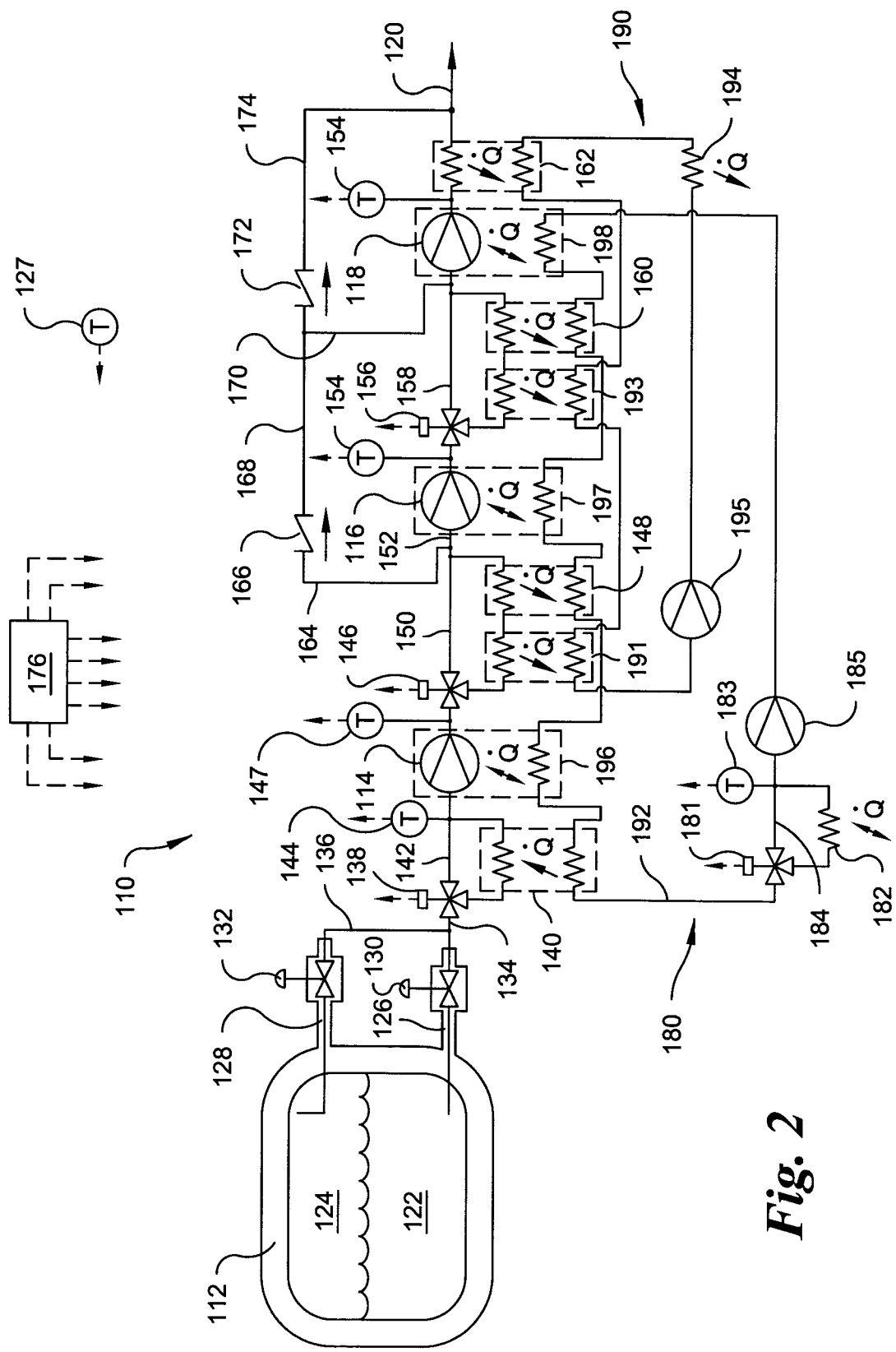
FIG. 2 is a schematic diagram showing a system in accordance with a second exemplary embodiment of the invention.

Referring to FIG. 2, another exemplary embodiment of a compression system 110 is shown. In this exemplary embodiment, elements shared with the first embodiment (system 10) are represented by reference numerals increased by a factor of 100. For example, the storage tank 12 of system 10 corresponds to the storage tank 112 of system 110. In the interest of clarity, some features of system 110 that are shared with, and substantially identical to, system 10 are numbered in FIG. 2, but are not specifically referred to in the specification in relation to system 110.

System 110 includes many of the features of system 10, including but not limited to the arrangement and operation of the compression stages 114, 116, 118 and the arrangement and operation of the heat exchangers 140, 148, 160. As described in greater detail below, system 110 includes additional heat exchanging capabilities which allow the system 110 to operate under a wider range of operating conditions.

System 110 includes a second coolant loop 190 through which a coolant circulates via a compressor 195. In addition, a heat exchanger 194 could optionally be provided on the coolant loop 190, which cools or warms the coolant against an external heat sink, for example, ambient air or water. A valve and bypass conduit (not shown) enable the coolant to bypass the heat exchanger 194 when desired. The coolant in this coolant loop 190 preferably has a lower freezing point than water. Examples of suitable coolants include propylene glycol, Di-Limonene, or mineral or vegetable oil. The second coolant loop 190 is particularly advantageous for system 110, which may otherwise require a chiller to reduce the coolant temperature, particularly in those locations that experience relatively high ambient temperatures.

System 110 includes additional inter-stage heat exchangers 191, 193, which are connected to the upstream end of the inter-stage heat exchangers 148, 160, respectively, which operate in the same manner as heat exchangers 48 and 60 in the system 10 shown in FIG. 1. When the controller 176 actuates the valve so that the process fluid is flowing though the heat exchangers 191, 193, located between the first and second compression stages 114, 116, the first heat exchanger 191 will ordinarily cool the process fluid to a temperature at or just above ambient temperature. Then the second heat exchanger 148 further cools the process fluid. This is done to minimize the amount of heat added to coolant loop 180 so it may operate at as low a temperature as possible. The heat exchangers 193, 160 located between the second and third compression stages 116, 118 operate in the same manner as the heat exchangers 191, 148 located between the first and second compression stages 114, 116.

As shown in system 110, each of the compression stages 114, 116, 118 may optionally include cooling jackets 196, 197, 198 to cool each compression stage 114, 116, 118 as needed. In this embodiment, the coolant in the coolant loop 180 circulates through each of the cylinder jackets 196, 197, 198. Alternatively, a secondary fluid could be circulated through the cylinder jackets 196, 197, 198 and cooled against the coolant in the coolant loop 180. Alternatively or additionally, the cylinder jackets 196, 197, 198 could exchange heat against the coolant in the coolant loop 190 instead of coolant loop 180.

The heat exchanger 62, 162 at the outlet of the system could exchange heat against the coolant in coolant loop 80 as shown in FIG. 1 and/or coolant loop 190 as shown in FIG. 2.

It should be understood that the number of compression stages shown in systems 10, 110 is intended to be merely exemplary. Any number of stages could be provided, in accordance with the requirements of the application in which the compression system is implemented.

Figure 3:
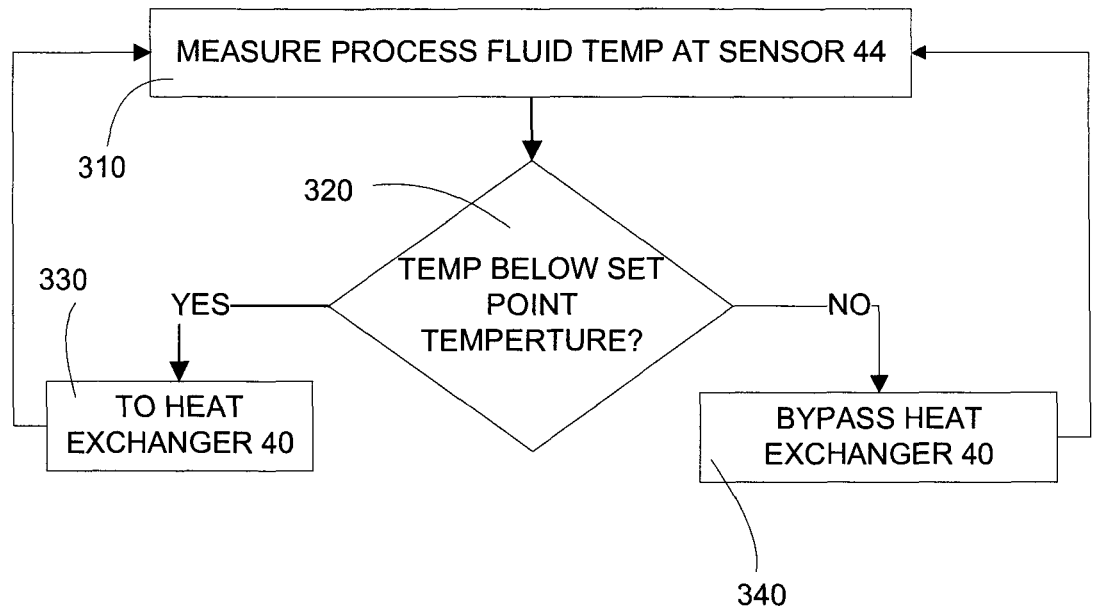
FIGS. 3 and 4 are flow diagrams illustrating an exemplary method of operating the first exemplary embodiment of the invention.
Figure 4:
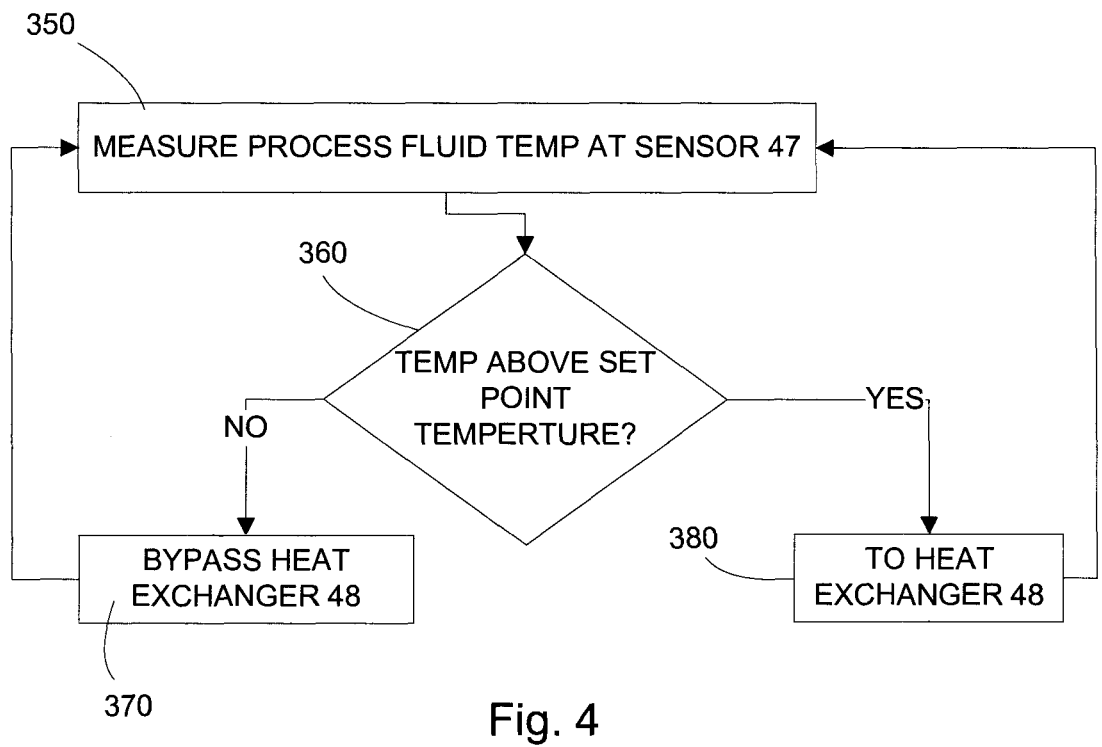

FIGS. 3 and 4 represent flow diagrams showing an exemplary method of system 10. Referring to FIG. 3, the temperature of the process fluid is measured at sensor 44 (step 310) prior to the process fluid entering the first compression stage 14, and is conveyed to controller 76. The controller 76 then compares the measured temperature to a set point temperature (step 320). If the measured temperature of the process fluid is lower than the set point temperature, controller 76 causes the valve 38 to direct the process fluid through a first heat exchanger 40 (step 330), which warms the process fluid. Conversely, if the measured temperature of the process fluid received is above the set point temperature, the controller 76 causes the valve 38 to direct the process fluid to the bypass conduit 42, which bypasses the heat exchanger 40 (step 340). The steps recited in this paragraph are repeated periodically, as the process fluid continues to flow into the first compression stage 14.

Referring to FIG. 4, the temperature of the process fluid exiting the first compression stage 14 is measured by temperature sensor 47 (step 350). Then, the controller 76 compares the temperature of the process fluid to a set temperature (step 360). If the measured temperature of the process fluid is above the set point temperature, the controller 76 causes the valve 46 to route the process fluid through heat exchanger 48 (step 380) to be cooled before being passed to the second compression stage 16. If the temperature of the process fluid received by valve 46 is at or below the set point temperature (or, optionally, below the set point temperature) the controller 76 instructs the valve 46 to convey the process fluid to the bypass conduit 50, which bypasses the heat exchanger 48 (step 370).

The controller 76 is preferably programmed to prevent unnecessarily frequent operation of the valve 38 after performing step 320 or step 360. For example, the controller 76 could be programmed not to change the position of the valve 38 unless the temperature of the process fluid changes by a predetermined minimum amount from the previous temperature measurement. In a multiple stage system (such as system 10), steps 350, 360, 370 and 380 are performed between each of the compression stages. In addition, the method illustrated in FIGS. 3 and 4 and described herein are equally applicable to the system 110.

It should also be understood that the set point temperatures described herein in connection with systems 10, 110 and the methods of operating the systems 10, 110 are intended to be one example of a temperature criterion used by the controller 76, 176 to determine how the process fluid is distributed between heat exchangers and bypass conduits—in keeping with the objective of enabling the system 10, 110 to operate during the transition period without venting the process fluid. Using the heat exchanger 48 of system 10 as an example, assume that the temperature of the process fluid at temperature sensor 47 when the system 10 reaches steady-state operating conditions is −60 degrees C. In order to enable the system 10 to function during the transition period without venting the process fluid, the controller 76 could be configured to cause the valve 46 to direct all of the process fluid through the heat exchanger 48 if the temperature of the process fluid (as measured by sensor 47) is greater than a set point temperature of −60 degrees C. to direct all of the process fluid through the bypass conduit 50 if the measured temperature is equal to or less than the set point temperature. In this example, the temperature criterion is equal to the set point temperature.

Alternatively, the controller 76 could be configured for hysteresis. For example, the controller 76 could be configured to cause the valve 46 to direct all of the process fluid through the heat exchanger 48 if the temperature of the process fluid (as measured by sensor 47) is five degrees or more above the set point temperature of −60 degrees C. to direct all of the process fluid through the bypass conduit 50 if the measured temperature is five degrees or more below the set point temperature. If the measured temperature is within the ten degree range (five degrees above and below) the set point temperature, the controller 76 simply maintains the existing position of the valve 46. In this case, the temperature criterion is a temperature reading that departs from the set point temperature by at least five degrees.

As noted above, the controller 76 could also be a PID controller. For example, the controller 76 could be configured distribute the process fluid between the heat exchanger 48 and the bypass conduit 50 in a manner that is intended to maintain the temperature of the process fluid within a desired temperature range.

While aspects of the present invention have been described in connection with the preferred embodiments of the various figures, it is to be understood that other similar embodiments may be used or modifications and additions may be made to the described embodiment for performing the same function of the present invention without deviating therefrom. The claimed invention, therefore, should not be limited to any single embodiment, but rather should be construed in breadth and scope in accordance with the appended claims.

The invention claimed is:

1. A fluid compression system for compressing a fluid, the fluid compression system comprising:
   (a) a first heat exchanger to provide heat exchange between a first coolant and an external heat sink;
   (b) a second heat exchanger to provide heating of a fluid from a tank via heat exchange with the first coolant;
   (c) a multi-stage compressor comprising:
      (c1) a first compression stage operatively disposed to receive the fluid from the second heat exchanger;
      (c2) at least one of (i) a third heat exchanger to provide cooling of at least a portion of the fluid leaving the first compression stage via heat exchange with the first coolant or (ii) a first cooling jacket to provide cooling of the fluid in the first compression stage via heat exchange with the first coolant; and
      (c3) a second compression stage operatively disposed to receive at least a portion of the fluid from the first compression stage; and
   (d) a first coolant loop operatively disposed to circulate the first coolant through the first heat exchanger, the second heat exchanger, and the at least one of the third heat exchanger or the first cooling jacket.

2. The fluid compression system of claim 1 further comprising:
   (e) a first valve for receiving the fluid from the tank;
   (f) a first bypass conduit to electively convey the fluid from the tank without the fluid passing through the second heat exchanger;
   wherein the first valve is operatively disposed to distribute the fluid to the second heat exchanger and the first bypass conduit;
   (g) a first temperature sensor operatively disposed to measure a temperature of the fluid entering the first compression stage; and
   (h) a controller in signal communication with the first temperature sensor, the controller configured to cause the first valve to distribute at least a portion of the fluid to the second heat exchanger when the first temperature sensor detects that the temperature measured by the first temperature sensor is less than a first temperature criterion, and to cause the first valve to distribute at least a portion of the fluid to the first bypass conduit when the first temperature sensor detects that the temperature measured by the first temperature sensor is greater than the first temperature criterion.

3. The fluid compression system of claim 2, wherein the controller is configured to cause the first valve to direct all the fluid to the second heat exchanger when the first temperature sensor detects that the temperature measured by the first temperature sensor is less than the first temperature criterion, and to cause the first valve to distribute all the fluid to the first bypass conduit when the first temperature sensor detects that the temperature measured by the first temperature sensor is greater than the first temperature criterion.

4. The fluid compression system of claim 2, wherein the first temperature criterion is a first set point temperature.

5. The fluid compression system of claim 2 further comprising:
   a second valve for receiving the fluid from the first compression stage;
   a second bypass conduit to electively convey the fluid from the first compression stage without the fluid passing through the third heat exchanger; and a second temperature sensor operatively disposed to measure a temperature of the fluid leaving the first compression stage;

wherein the second valve is operatively disposed to distribute the fluid to the third heat exchanger and the second bypass conduit; and wherein the controller is in signal communication with the second temperature sensor and configured to cause the second valve to distribute at least a portion of the fluid to the third heat exchanger when the second temperature sensor detects that the temperature measured by the second temperature sensor is greater than a second temperature criterion, and to cause the second valve to distribute at least a portion of the fluid to the second bypass conduit when the second temperature sensor detects that the temperature measured by the second temperature sensor is less than the second temperature criterion.

6. The fluid compression system of claim 5, wherein the controller is configured to cause the second valve to direct all of the fluid to the third heat exchanger when the second temperature sensor detects that the temperature measured by the second temperature sensor is greater than the second temperature criterion, and to cause the second valve to direct all of the fluid to the second bypass conduit when the second temperature sensor detects that the temperature measured by the second temperature sensor is less than the second temperature criterion.

7. The fluid compression system of claim 5, wherein the second temperature criterion is a second set point temperature.

8. The fluid compression system of claim 1,
wherein the multistage compressor further comprises
a third compression stage operatively disposed to receive at least a portion of the fluid from the second compression stage; and
at least one of (i) a fourth heat exchanger to provide cooling of at least a portion of the fluid leaving the second compression stage via heat exchange with the first coolant, or (ii) a second cooling jacket to provide cooling of the fluid in the second compression stage via heat exchange with the first coolant; and
wherein the first coolant loop is further operatively disposed to circulate the first coolant through the at least one of the fourth heat exchanger or the second cooling jacket.

9. The fluid compression system of claim 8,
wherein the multistage compressor further comprises
a third bypass conduit to electively convey the fluid from the second compression stage to the third compression stage without the fluid passing through the fourth heat exchanger;
a third valve for receiving the fluid from the second compression stage; and
a third temperature sensor operatively disposed to measure a temperature of the fluid leaving the second compression stage; and
wherein the controller is further in signal communication with the third temperature sensor, the controller configured to cause the third valve to distribute at least a portion of the fluid to the fourth heat exchanger when the third temperature sensor detects that the temperature measured by the third temperature sensor is greater than a third temperature criterion, and to cause the third valve to distribute at least a portion of the fluid to the third bypass conduit when the third temperature sensor detects that the temperature measured by the third temperature sensor is less than the third temperature criterion.

10. The fluid compression system of claim 9, wherein the controller is configured to cause the third valve to direct all the fluid to the fourth heat exchanger when the third temperature sensor detects that the temperature measured by the third temperature sensor is less than the third temperature criterion, and to cause the third valve to distribute all the fluid to the third bypass conduit when the third temperature sensor detects that the temperature measured by the third temperature sensor is greater than the third temperature criterion.

11. The fluid compression system of claim 10, wherein the third temperature criterion is a third set point temperature.

12. The fluid compression system of claim 1 further comprising:
a fifth heat exchanger to provide heat exchange between a second coolant and a second external heat sink;
wherein the multistage compressor further comprises a sixth heat exchanger to provide cooling of at least a portion of the fluid leaving the first compression stage via heat exchange with the second coolant; and
a second coolant loop operatively disposed to circulate the second coolant through the fifth heat exchanger and the sixth heat exchanger.

13. The fluid compression system of claim 8, further comprising:
a first pressure bypass operatively disposed to enable a portion of the fluid that has passed through the first compression stage to bypass the second compression stage.

14. A method for compressing a fluid supplied from a cryogenic storage vessel, the method comprising:
(a) circulating a first coolant through a first heat exchanger, a second heat exchanger, and at least one of a third heat exchanger or a first cooling jacket;
(b) heating the fluid by passing at least a portion of the fluid to the second heat exchanger to exchange heat with the first coolant thereby cooling the first coolant;
(c) compressing the fluid from step (b) in a first compression stage of a multi-stage compressor; and
(d) further compressing at least a portion of the fluid from the first compression stage in a second compression stage of the multi-stage compressor;
wherein the first coolant is circulated to the first heat exchanger to exchange heat with an external heat sink; and
wherein at least one of (i) the fluid is cooled by heat exchange with the first coolant flowing through the first cooling jacket during step (c) or (ii) at least a portion of the fluid is passed to the third heat exchanger and is cooled by heat exchange with the first coolant in the third heat exchanger after step (c) and before step (d).

15. The method of claim 14 further comprising:
further compressing at least a portion of the fluid from the second compression stage in a third compression stage of the multi-stage compressor; and
wherein at least one of (i) the fluid is cooled by heat exchange with the first coolant flowing through a second cooling jacket during step (d) or (ii) at least a portion of the fluid is passed to a fourth heat exchanger and is cooled by heat exchange with the first coolant in the fourth heat exchanger after step (d) wherein the first coolant is circulated through the fourth heat exchanger.

16. The method of claim 14 further comprising:
measuring a temperature of the fluid prior to entering the first compression stage; and
adjusting the amount of the fluid passed to the second heat exchanger to heat more fluid when the measured temperature of the fluid prior to entering the first compression stage is less than a first temperature criterion, and to heat less fluid when the measured temperature of the fluid prior to entering the first compression stage is greater than the first temperature criterion.

17. The method of claim 14 further comprising:
measuring a temperature of the fluid after passing through the first compression stage;
adjusting the amount of the fluid passed to the third heat exchanger to cool more fluid when the measured temperature of the fluid after passing through the first compression stage is greater than a second temperature criterion and to cool less fluid when the measured temperature of the fluid after passing through the first compression stage is less than the second temperature criterion.

18. The method of claim 14 further comprising:
measuring a temperature of the fluid after passing through the second compression stage;
adjusting the amount of the fluid passed to a fourth heat exchanger to cool more fluid when the measured temperature of the fluid after passing through the second compression stage is greater than a third temperature criterion and to cool less fluid when the measured temperature of the fluid after passing through the second compression stage is less than the third temperature criterion;
wherein the first coolant is also circulated through the fourth heat exchanger.

19. The method of claim 14 further comprising:
circulating a second coolant through a fifth heat exchanger and a sixth heat exchanger;
wherein the second coolant is circulated to the fifth heat exchanger to exchange heat with a second external heat sink; and
wherein the fluid is passed to the sixth heat exchanger and is cooled by heat exchange with the second coolant in the sixth heat exchanger after step (c) and before step (d).

20. A method for compressing a fluid, the method comprising:
(a) providing the fluid compression system of claim 1;
(b) circulating the first coolant through the first heat exchanger, the second heat exchanger, and at least one of the third heat exchanger or the first cooling jacket;
(c) heating the fluid by passing at least a portion of the fluid to the second heat exchanger to exchange heat with the first coolant thereby cooling the first coolant;
(d) compressing the fluid from step (c) in the first compression stage of the multi-stage compressor; and
(e) further compressing at least a portion of the fluid from the first compression stage in the second compression stage of the multi-stage compressor;
wherein the first coolant is circulated to the first heat exchanger to exchange heat with the external heat sink to cool the first coolant against the external heat sink when a temperature of the coolant exceeds ambient temperature by a predetermined amount; and
wherein at least one of (i) the fluid is cooled by heat exchange with the first coolant flowing through the first cooling jacket during step (d) or (ii) at least a portion of the fluid is passed to the third heat exchanger and is cooled by heat exchange with the first coolant in the third heat exchanger after step (d) and before step (e).

21. The system of claim 1 further comprising:
a valve and a bypass conduit to enable the first coolant to bypass the first heat exchanger or direct the first coolant through the first heat exchanger; and
a controller that controls the valve, the controller configured to operate the valve to direct the first coolant through the first heat exchanger to cool the first coolant against the external heat sink when a temperature of the first coolant exceeds ambient temperature by a predetermined upper amount, and the controller configured to operate the valve to cause the first coolant to flow through the first heat exchanger to warm the first coolant when the temperature of the first coolant drops below the ambient temperature by a predetermined lower amount.

22. The method of claim 14 where the first coolant is cooled against the external heat sink when the temperature of the first coolant exceeds an ambient temperature by a predetermined upper amount and where the first coolant is heated against the external heat sink when the temperature of the first coolant drops below the ambient temperature by a predetermined lower amount.

* * * * *